Aug. 6, 1968  H. NÄDLER  3,396,066
APPARATUS FOR PLACING CARCASS LAYERS ON A TIRE BUILDING DRUM
Filed July 27, 1964  3 Sheets-Sheet 1

INVENTOR
Heinrich Nädler
By

United States Patent Office 3,396,066
Patented Aug. 6, 1968

3,396,066
APPARATUS FOR PLACING CARCASS LAYERS
ON A TIRE BUILDING DRUM
Heinrich Nädler, Neustadt am Rubenberge, Germany,
assignor to Continental Gummi-Werke AG., Hannover,
Germany
Filed July 27, 1964, Ser. No. 385,285
Claims priority, application Germany, July 30, 1963,
C 30,583
8 Claims. (Cl. 156—401)

ABSTRACT OF THE DISCLOSURE

A tire building machine having a tire building drum with side portions for engagement with marginal carcass portions to be provided with bead core means, in which an annular flexible inflatable folding member with two oppositely located marginal portions has its outer periphery arranged adjacent to a side portion of said drum for folding a marginal carcass portion thereon around bead core means placed on said last mentioned marginal carcass portion, while first clamping means hold one marginal portion of said folding member and second clamping means movable relative to said first clamping means hold the other portion of said folding member, at least one of said two marginal portions of said folding member being held by its respective clamping means therefor so as to be movable to a limited extent in radial direction of the drum.

---

The present invention relates to tire building machines, and, more specifically, to an arrangement for placing the carcass layers within the range of the tire bead portions on a tire building drum. The present invention concerns in particular an arrangement of the above-mentioned type in which the placing of the carcass layers within the range of the tire bead portions is effected by means of an annular inflatable body.

Arrangements have been known heretofore according to which an inflatable body has its marginal portions clamped in while one of the two clamping members having a marginal portion of said inflatable body clamped therein, is axially displaceable with regard to the tire building drum. Such inflatable bodies, however, are employed only when placing the lateral rubber strips for the tire.

It is an object of the present invention to provide an apparatus for placing the carcass layers within the range of the tire bead portions by means of an inflatable body, which in non-inflated condition will require a minimum of space.

It is another object of this invention to provide an arrangement as set forth in the preceding paragraph which is simple in construction and easy to operate.

Figure 1:
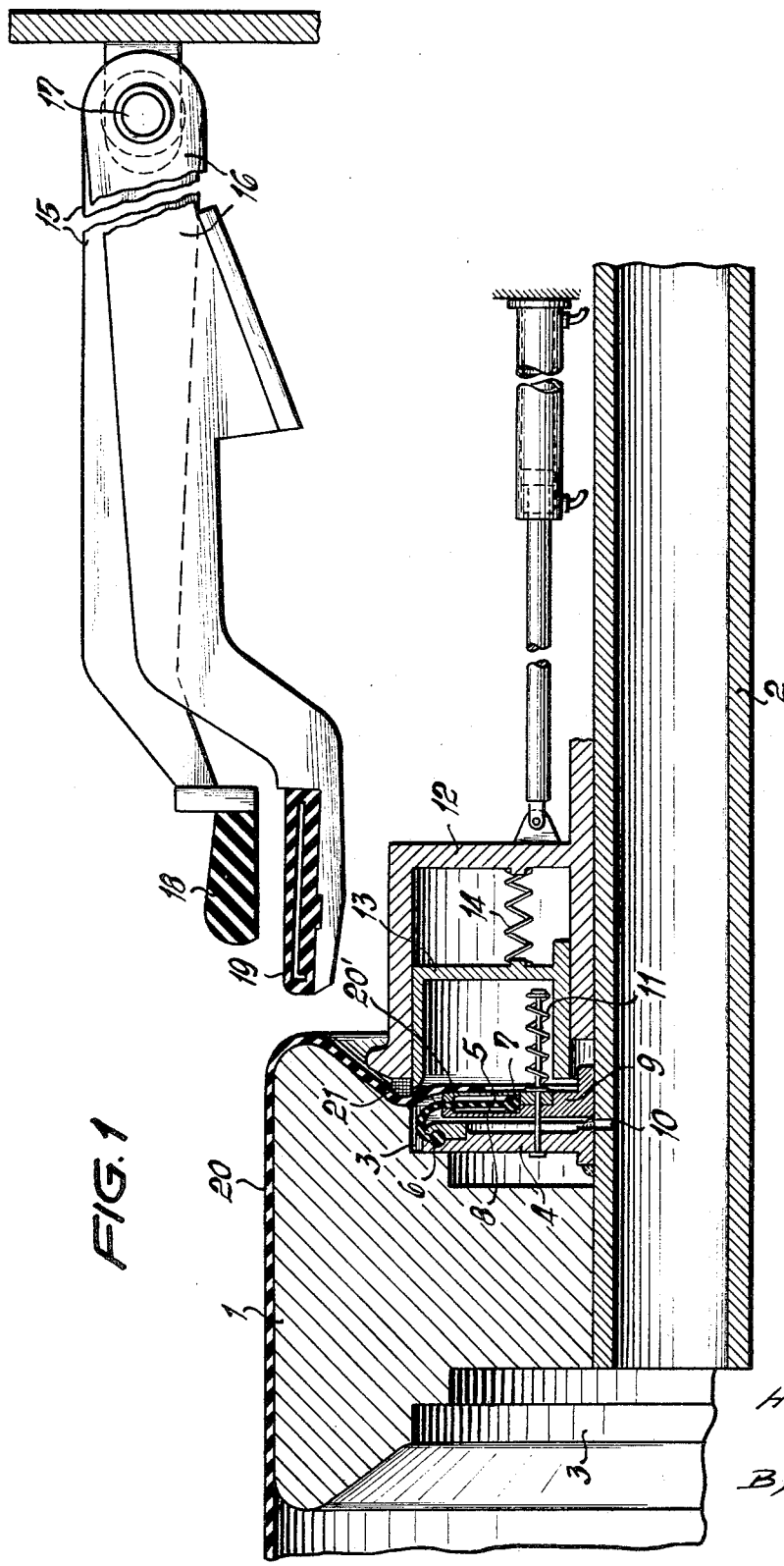
Figure 2:
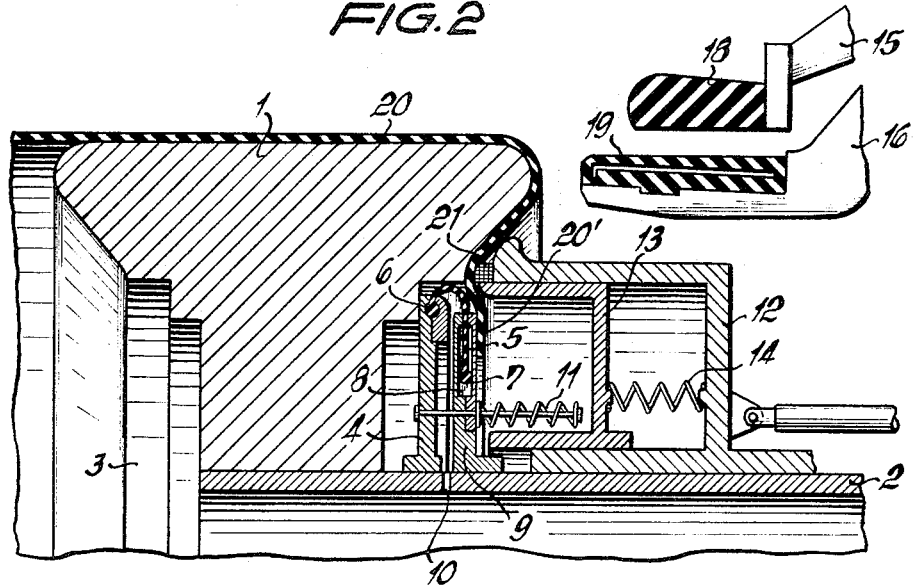
Figure 3:
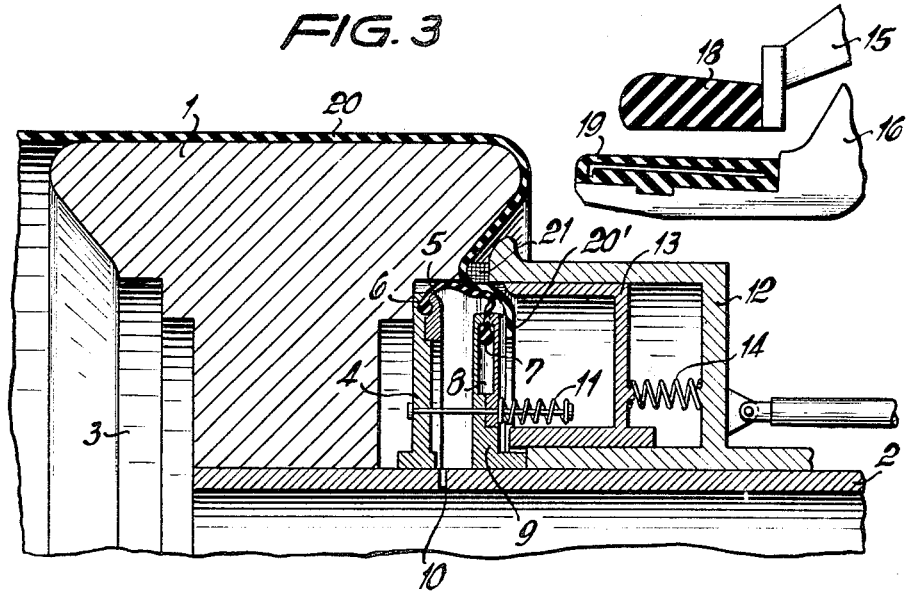
Figure 4:
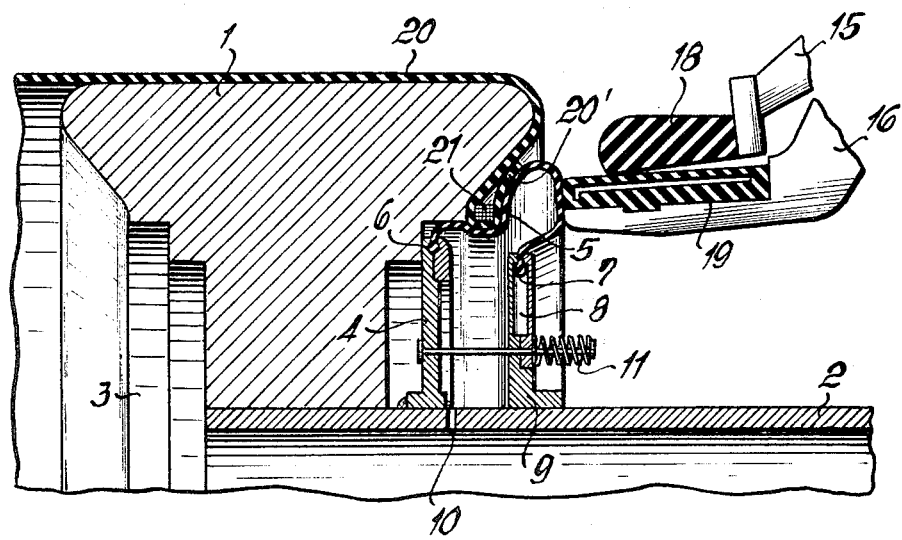

These and other objects and advantages of the invention will appear more clearly from the following specification in connection with the accompanying drawings, in which:

FIGURE 1 diagrammatically illustrates a portion of a tire building machine equipped with an arrangement according to the invention for placing the carcass layers within the range of the tire bead portions against a tire building drum;

FIGURES 2, 3 and 4 illustrate the tire building machine of FIGURE 1 in different working stages.

As mentioned above, the present invention concerns an arrangement for placing the lateral portions of carcass layers against a tire building drum by means of an inflatable body having the marginal portions thereof clamped into clamping members. The present invention is characterized in that at least one marginal portion of the inflatable body is displaceably connected to its clamping member.

Referring now to the drawings in detail, the tire building machine shown therein comprises a high shoulder drum 1 which is laterally undercut and which is journalled on the free end of a tube 2 which has its other end, in a manner known per se, connected to a frame or the like. Both sides of drum 1 are provided with recesses 3 for receiving a disc 4 connected, for instance by welding, to tube 2. The outer periphery of disc 4 forms a clamp for holding an annular inflatable body 5 of rubber or rubber-like material. When the inflatable body 5 is in non-inflated condition, its marginal portions 6 and 7 have different diameters. As will be evident from the drawing, in non-inflated position of inflatable body 5, the diameter of the marginal portion 7 is considerably less than the diameter of the marginal portion 6. Marginal portion 7 is arranged within a radial slot 8 of a disc 9 supported by tube 2. In contrast to disc 4, disc 9 is slidably mounted on tube 2 so as to be able to slide thereon in axial direction thereof. The chamber confined by the inflatable body 5 and discs 4 and 9 and the section of tube 2 between said discs communicates with a conduit 10 extending through the wall of tube 2 and adapted to convey a pressure medium as, for instance air under pressure into said chamber. Furthermore, disc 9 is by means of pressure spring 11 continuously urged toward disc 4 so as to occupy a position at which the discs 4 and 9 have the least spacing from each other.

Slot 8 is considerably reduced in width at the outer circumference of disc 9, whereas the marginal portion 7 of the inflatable body 5 is reinforced in such a way that its thickness substantially corresponds to the width of slot 8. Consequently, marginal portion 7 cannot slip out of slot 8 through the reduced slot in the outer periphery of disc 9.

Also axially displaceably mounted on tube 2 is a core placer which comprises two telescopically interengaging and displaceable annular members 12 and 13 having a pressure spring 14 arranged therebetween. Each of said annular members 12 and 13 has an outer and an inner cylindrical wall. As will be evident from the drawing, the inner cylindrical wall of annular member 12 is slidable on tube 2, whereas the inner wall of annular member 13 is slidable on the inner wall of annular member 12.

Two groups of grippers 15 and 16 respectively are distributed over the circumference of drum 1. Grippers 15 and 16 form levers pivotally journalled at 17. The grippers of each group have their free ends connected to each other by annular rubber bodies 18 and 19, respectively. The grippers 15 and 16 are tiltable manually or automatically in any convenient manner, for instance hydraulically, as disclosed, for example, in the application of Richard Beckadolph et al., Ser. No. 246,796, filed Dec. 24, 1962, now U.S. Patent No. 3,178,327. A tilting movement of each group of grippers 15, 16 relative to each other thus results in a change in the diameter of the rubber rings 18 and 19, respectively. Joint movements of grippers 15 and 16 make possible the placing of marginal portions of the carcass 20 on drum 1 when the edge 20' of the carcass 20 is firmly clamped between the rings 18 and 19.

After the carcass 20 has been placed on drum 1 so that the marginal portions of the carcass extend in radial direction substantially perpendicular to the axis of drum 1 (this position having been brought about by the grippers 15 and 16 in a manner known per se), the bead core 21 is placed against the marginal portion of the carcass by means of the annular members 12 and 13. If, now, a pressure medium, for instance compressed air, is conveyed through bore 10 into the interior of the inflatable body 5, the effective outer diameter of body 5 increases while marginal portion 7 in slot 8 will move in the direction toward the outer periphery of disc 9. Eventually, with increasing pressure in the inflatable body 5, the thrust of spring 11 will be overcome, so that disc 9 will move away from disc 4 and the inflatable rubber body will be located below the bead core 21, will lift the marginal portion 20' of the carcass, and finally will displace ring 13 against the thrust of spring 14. Inasmuch as bead core 21 is now centered, no further action of the core placer upon bead core 21 is necessary. Consequently, the bead core placer 12, 13 can be withdrawn. By increasing the pressure in the inflatable body 5, marginal portion 7 reaches the outer end of the wider section of slot 8. Furthermore, inflatable body 5 still further lifts marginal portion 20' until the latter occupies the position shown in FIG. 4 in which it entirely extends around bead core 21. The placing of the marginal portion 20' has then been completed.

In order to prevent too strong a bulging of the inflatable body 5, the grippers 15, 16 may be moved radially inwardly to a desired position so that they form a support for the inflatable body 5.

The inflatable body 5 is preferably given a cross-sectional shape in conformity with FIG. 1, so that when it is not acted upon by a pressure medium, it will always have the cross-sectional shape shown in FIG. 1. If desired, the marginal portion 7 may be provided with sealing lips or the like in such a way that a pressure loss through slot 8 will be definitely excluded. It is also possible to introduce a pressure medium into the free space within slot 8 and outside the diameter of the marginal portion 7 in order to accelerate a return of marginal portion 7 to the position of FIG. 1. To this end, an inlet opening may be provided in the wall of disc 9 directly below the outer peripheral portion of disc 9 where slot 8 narrows considerably. If desired, disc 9 may be modified similar to disc 9, so that also the marginal portion 6 will be displaceable in a slot corresponding to slot 8.

As will be evident from the above, an arrangement according to the present invention has the advantage that the inflatable body when in non-inflated condition requires but little space and has a comparatively small outer diameter. As will also be evident from the above, the possibility of deforming the inflatable body is of particular importance for the placing of the bead cores of the carcass portions within the range of the bead cores of the tire to be built. The inflatable body can first be adjusted to a very small diameter and can then be increased considerably in diameter in such a way that the marginal fabric sections which are to be placed around the bead core can be turned by about 180° so that in their end position they are completely folded around the bead cores and rest against the lateral portions of the tire carcass.

It is, of course, to be understood, that the present invention is, by no means, limited to the particular arrangements shown in the drawings, but also comprises any modifications within the scope of the appended claims. It is furthermore mentioned that a power-cylinder is provided capable to keep the annular member 12 in the position according to FIGS. 1–3 and to withdraw the bead core placer 12, 13.

What I claim is:

1. In a tire building machine: a tire building drum having side portions for engagement with marginal carcas portions to be provided with bead core means, an annular flexible inflatable folding member having two oppositely located marginal portions and having its outer periphery arranged adjacent to a side portion of said drum for folding a marginal carcass portion thereon around bead core means placed on said last mentioned marginal carcass portion, first clamping means holding one marginal portion of said folding member, second clamping means movable relative to said first clamping means toward and away therefrom and holding the other marginal portion of said folding member, at least one of said two marginal portions of said folding member being held by its respective clamping means therefor so as to be movable to a limited extent in radial direction of said drum, and means for admitting fluid pressure to the interior of said folding member.

2. In a tire building machine: a tire building drum having side portions for engagement with marginal carcass portions to be provided with bead cores, said drum having a central bore, a supporting member extending into said bore and supporting said drum, said drum also having abutment surface means facing in axial direction of said drum, first annular clamping means extending around and connected to said supporting member for abutting engagement with said abutment surface means, second annular clamping means extending around said supporting member and being movable relative to and in axial direction of said supporting member toward and away from said first clamping means, an annular trough-shaped flexible member with two marginal areas, said flexible member having one marginal area thereof held by said first clamping means and having its other marginal area held by said second clamping means, at least one of said marginal areas being so held in the respective clamping means therefor as to be displaceable to a limited extent in the radial direction of said drum, and conduit means leading into the space confined by said flexible member and said first and second clamping means for conveying fluid pressure thereinto.

3. In a tire building machine: a tire building drum having side portions for engagement with marginal carcass portions to be provided with bead core means, an annular flexible folding member having two oppositely located marginal portions and having its outer periphery arranged adjacent to a side portion of said drum for folding a marginal carcass portion thereon around said core means placed on said last mentioned marginal carcass portion, first clamping means holding one marginal portion of said folding member, second clamping means movable relative to said first clamping means toward and away therefrom in axial direction of said drum and holding the other marginal portion of said folding member, at least one of said clamping means having recess means extending in radial direction of said drum and holding the respective adjacent marginal portion of said folding member so as to permit movement thereof within said recess means, and means for conveying fluid pressure to the interior of said folding member for causing the same to move outwardly in radial direction of said drum.

4. An arrangement according to claim 3, in which the end of the marginal portion of said folding member which is located in said recess means has an increased thickness with regard to the adjacent area of said folding member.

5. In a tire building machine: a tire building drum having side portions for engagement with marginal carcass portions to be provided with bead core means, an annular flexible inflatable folding member having two oppositely located marginal portions and having its outer periphery arranged adjacent to a side portion of said drum for folding a marginal carcass portion thereon around bead core means placed on said last mentioned marginal carcass portion, first clamping means holding one marginal portion of said folding member, second clamping means movable relative to said first clamping means toward and away therefrom in axial direction of said drum and holding the other marginal portion of said folding member, at least one of said two marginal portions of said folding member being held by its respective clamping means therefor so as to be movable to a limited extent in radial direction of said drum, means for admitting fluid pressure to the interior of said folding member, and yieldable means continuously urging said second clamping means toward said first clamping means, said yieldable means being adapted to yield in response to a certain pressure acting upon the interior of said folding member to thereby permit said pressure to increase the spacing between said first and second clamping means.

6. In a tire building machine: a tire building drum having side portions for engagement with marginal carcass portions to be provided with bead cores, said drum having a central bore, a supporting member extending into said bore and supporting said drum, said drum also having abutment surface means facing in axial direction of said drum, first annular clamping means extending around and being connected to said supporting member for abutting engagement with said abutment surface means, second annular clamping means extending around said supporting member and being movable relative to and in axial direction of said supporting member toward and away from said first clamping means, an annular trough-shaped flexible member surrounding said supporting member and having its periphery arranged adjacent to a side portion of said drum and being provided with two marginal areas, said flexible member having one marginal area thereof held by said first clamping means and having its other marginal area held by said second clamping means, at least one of said marginal areas being so held in the respective clamping means therefor as to be displaceable to a limited extent in the radial direction of said drum, conduit means for conveying fluid pressure into said flexible member and between said first and second clamping means, and bead core placing means surrounding said supporting member and movable relative thereto in axial direction thereof toward and away from said first and second clamping means, at least a portion of said bead core placing means being movable by said flexible member in inflated condition thereof away from said drum to permit said flexible member to complete folding a marginal carcass portion on said drum around bead core means on the respective adjacent marginal carcass portion.

7. An arrangement according to claim 6, in which said bead core placing means comprises two telescopically inter-engaging annular bodies and yieldable means continuously but yieldably urging the inner one of said annular bodies toward said second clamping means.

8. In a tire building machine: a tire building drum having side portions for engagement with marginal carcass portions to be provided with bead cores, said drum having a central bore, a supporting member extending into said bore and supporting said drum, said drum also having abutment surface means facing an axial direction of said drum, first annular clamping means extending around and connected to said supporting member for abutting engagement with said abutment surface means, second annular clamping means extending around said supporting member and being movable relative to and in axial direction of said supporting member toward and away from said first clamping means, an annular trough-shaped flexible member with two marginal areas, said flexible member having one marginal area thereof held by said first clamping means and having its other marginal area held by said second clamping means, at least one of said marginal areas being so held in the respective clamping means therefor as to be displaceable to a limited extent in the radial direction of said drum, conduit means leading into the space confined by said flexible member and said first and second clamping means for conveying fluid pressure thereinto, and gripper means distributed around said supporting means and having their free ends provided with rubber ring means, said gripper means being movable toward said flexible member for abutting engagement therewith in a certain inflated condition of said flexible member.

References Cited

UNITED STATES PATENTS

| 2,951,526 | 9/1960 | Haaso | 156—401 |
| 3,078,204 | 2/1963 | Appleby | 156—401 X |
| 3,127,294 | 3/1964 | Porter | 156—401 X |
| 3,184,360 | 5/1965 | Nadler et al. | 156—401 |

EARL M. BERGERT, *Primary Examiner.*

C. B. COSBY, *Assistant Examiner.*